United States Patent
Ohno et al.

(10) Patent No.: US 12,281,192 B2
(45) Date of Patent: Apr. 22, 2025

(54) POLYURETHANE CHAIN EXTENDER, COMPOSITION FOR FORMING POLYURETHANE RESIN, POLYURETHANE RESIN, POLYURETHANE RESIN COMPOSITION, MOLDED BODY, AND ARTICLE

(71) Applicant: MITSUBISHI GAS CHEMICAL COMPANY, INC., Tokyo (JP)

(72) Inventors: Yuma Ohno, Kanagawa (JP); Yuka Akai, Kanagawa (JP); Takuma Hanaoka, Kanagawa (JP); Kousuke Ikeuchi, Kanagawa (JP); Kazuki Kouno, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 18/708,095

(22) PCT Filed: Nov. 4, 2022

(86) PCT No.: PCT/JP2022/041164
§ 371 (c)(1),
(2) Date: May 7, 2024

(87) PCT Pub. No.: WO2023/085209
PCT Pub. Date: May 19, 2023

(65) Prior Publication Data
US 2024/0425638 A1 Dec. 26, 2024

(30) Foreign Application Priority Data
Nov. 15, 2021 (JP) .................. 2021-185805

(51) Int. Cl.
| | | |
|---|---|---|
| C08G 18/32 | (2006.01) | |
| C08G 18/10 | (2006.01) | |
| C08G 18/24 | (2006.01) | |
| C08G 18/48 | (2006.01) | |
| C08G 18/66 | (2006.01) | |
| C08G 18/75 | (2006.01) | |
| C08L 75/02 | (2006.01) | |

(52) U.S. Cl.
CPC ......... *C08G 18/3234* (2013.01); *C08G 18/10* (2013.01); *C08G 18/246* (2013.01); *C08G 18/4854* (2013.01); *C08G 18/6685* (2013.01); *C08G 18/755* (2013.01); *C08L 75/02* (2013.01)

(58) Field of Classification Search
CPC .............. C08G 18/3234; C08G 18/10; C08G 18/4854; C08G 18/6685; C08G 18/246; C08G 18/755; C08L 75/02
See application file for complete search history.

(56) References Cited

U.S. PATENT DOCUMENTS

| | | |
|---|---|---|
| RE29,623 E | 5/1978 | Oertel et al. |
| 4,256,869 A | 3/1981 | Schulze et al. |
| 5,162,388 A | 11/1992 | Primeaux, II |
| 2006/0058453 A1 | 3/2006 | Argyropoulos et al. |
| 2013/0197270 A1 | 8/2013 | Yoshimura et al. |
| 2016/0024268 A1 | 1/2016 | Nishiguchi et al. |
| 2016/0207875 A1* | 7/2016 | Fukuda ................. C07C 265/04 |

FOREIGN PATENT DOCUMENTS

| | | |
|---|---|---|
| CN | 107663670 A | 2/2018 |
| JP | 55-009699 A | 1/1980 |
| JP | 2006-504849 A | 2/2006 |
| JP | 2009-91519 A | 4/2009 |
| JP | 2011-6382 A | 1/2011 |
| JP | 2011-46968 A | 3/2011 |
| JP | 2015-48411 | 3/2015 |
| WO | 2009/063729 | 5/2009 |
| WO | 2014/141475 A1 | 9/2014 |

* cited by examiner

*Primary Examiner* — Rabon A Sergent
(74) *Attorney, Agent, or Firm* — GREENBLUM & BERNSTEIN, P.L.C.

(57) ABSTRACT

A polyurethane chain extender includes an amine compound (X) represented by Formula (1) with a trans-isomer proportion in (X) of 50 mol % or more; a composition for forming a polyurethane-based resin including the polyurethane chain extender; a polyurethane-based resin formed by the composition for forming the polyurethane-based resin; a polyurethane-based resin obtained by reacting a polyisocyanate compound (A), a polyol compound (B) and the polyurethane chain extender; a polyurethane-based resin composition including the polyurethane-based resin; a molded body obtained by molding the polyurethane-based resin composition; and an article including the polyurethane-based resin composition or the molded body:

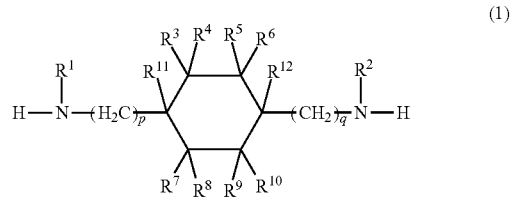

(1)

where $R^1$ to $R^{12}$ each independently represent a hydrogen atom or a hydrocarbon group having 1 or more and 4 or less of carbon atoms, p and q each independently represent an integer of 0 or more and 4 or less, and at least one of p and q is 1 or more.

20 Claims, No Drawings

POLYURETHANE CHAIN EXTENDER, COMPOSITION FOR FORMING POLYURETHANE RESIN, POLYURETHANE RESIN, POLYURETHANE RESIN COMPOSITION, MOLDED BODY, AND ARTICLE

TECHNICAL FIELD

The present invention relates to a polyurethane chain extender, a composition for forming a polyurethane-based resin, a polyurethane-based resin, a polyurethane-based resin composition, a molded body, and an article.

BACKGROUND ART

Polyurethane-based resins are excellent in, for example, mechanical strength, flexibility, abrasion resistance, oil resistance, and the like, and are widely used in various industrial fields.

Polyurethane-based resin can be obtained by, for example, a reaction of a polyisocyanate, a polyol, and a chain extender. Various physical properties of the obtained polyurethane-based resin can be adjusted by changing the types and blending ratios of the polyisocyanate, the polyol, and the chain extender.

Examples of the techniques relating to such a polyurethane-based resin include those described in Patent Documents 1 and 2.

Patent Document 1 describes a thermoplastic polyurethane resin obtained by adding a chain extender dispersion containing a chain extender, a non-aqueous dispersion medium, and a dispersion stabilizer to an isocyanate group-terminated prepolymer in a non-aqueous dispersion medium and subjecting the mixture to a chain extension reaction.

Patent Document 2 describes a polyurethane dispersion including a mixture of a polyisocyanate and a molecule having a hydrogen active moiety, and optionally a chain extender and/or a surfactant, in which the polyisocyanate includes a bis(isocyanatomethyl)cyclohexane compound.

CITATION LIST

Patent Document

Patent Document 1: JP 2009-91519 A
Patent Document 2: JP 2011-46968 A

SUMMARY OF INVENTION

Technical Problem

According to studies conducted by the present inventors, it has been found that the polyurethane-based resins described in Patent Documents 1 and 2 have room for improvement in terms of mechanical properties such as tensile strength, tensile elastic modulus, and hardness.

The present invention has been made in view of the above circumstances, and provides a polyurethane chain extender and a composition for forming a polyurethane-based resin, which are capable of improving the mechanical properties of an obtained polyurethane-based resin, and a polyurethane-based resin, a polyurethane-based resin composition, a molded body, and an article, which have improved mechanical properties.

Solution to Problem

The present inventors have found that mechanical properties of a resulting polyurethane-based resin can be improved by using a specific amine compound as a polyurethane chain extender, thereby completing the present invention.

That is, according to the present invention, there are provided a polyurethane chain extender, a composition for forming a polyurethane-based resin, a polyurethane-based resin, a polyurethane-based resin composition, a molded body, and an article as described below.

[1]
A polyurethane chain extender, including an amine compound (X) represented by the following Formula (1), in which a proportion of a trans-isomer in the amine compound (X) is 50 mol % or more:

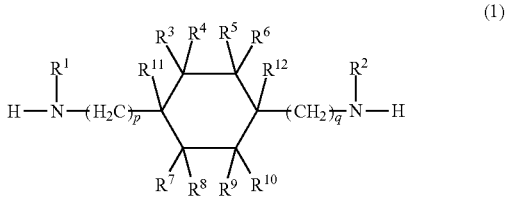

where in the above Formula (1), $R^1$ to $R^{12}$ each independently represent a hydrogen atom or a hydrocarbon group having 1 or more and 4 or less of carbon atoms, p and q each independently represent an integer of 0 or more and 4 or less, and at least one of p or q is 1 or more.

[2] The polyurethane chain extender according to [1], in which the amine compound (X) includes at least one selected from 1,4-bis(aminomethyl)cyclohexane and derivatives thereof.

[3]
The polyurethane chain extender according to [1] or [2], in which the proportion of a trans-isomer in the amine compound (X) is 100 mol % or less.

[4]
A composition for forming a polyurethane-based resin, including a polyisocyanate compound (A), a polyol compound (B), and the polyurethane chain extender (C) described in any one of the above [1] to [3].

[5]
A composition for forming a polyurethane-based resin, including: an isocyanate group-terminated prepolymer obtained by reacting a polyisocyanate compound (A) with a polyol compound (B); and the polyurethane chain extender (C) described in any one of [1] to [3].

[6]
A polyurethane-based resin formed from the composition for forming the polyurethane-based resin described in [4] or [5].

[7]
A polyurethane-based resin obtained by reacting a polyisocyanate compound (A), a polyol compound (B), and the polyurethane chain extender (C) described in any one of [1] to [3].

[8]
The polyurethane-based resin according to [6] or [7], in which a ratio of the number of active hydrogen groups in the polyurethane chain extender (C) to a total amount of the number of active hydrogen groups in the polyol compound (B) and the number of active hydrogen groups in the polyurethane chain extender (C) is 0.01 or more and 0.5 or less.

[9]
The polyurethane-based resin according to any one of [6] to [8], in which a ratio of the number of isocyanate groups in the polyisocyanate compound (A) to a total amount of the number of active hydrogen groups in the polyol compound (B) and the number of active hydrogen groups in the polyurethane chain extender (C) is 0.5 or more and 1.5 or less.

[10]
The polyurethane-based resin according to any one of [6] to [9], in which the polyurethane-based resin has a tensile strength of 1.0 MPa or more as measured under conditions of a tensile rate of 200 mm/min and a chuck-to-chuck distance of 50 mm in accordance with JIS K 6251:2017.

[11]
The polyurethane-based resin according to any one of the above [6] to [10], in which a tensile elastic modulus of the polyurethane-based resin measured in accordance with JIS K 6251:2017 under conditions of a tensile speed of 200 mm/min and a chuck-to-chuck distance of 50 mm is 2.5 MPa or more.

[12]
The polyurethane-based resin according to any one of [6] to [11], in which the polyurethane-based resin has a Shore A hardness of 50 or more as measured in accordance with JIS K 6253:2012.

[13]
The polyurethane-based resin according to any one of [6] to [12], which is a polyurethane-urea resin.

[14]
A polyurethane-based resin composition, including the polyurethane-based resin described in any one of [6] to [13].

[15]
A molded body formed by molding the polyurethane-based resin composition described in [14].

[16]
An article, including the polyurethane-based resin composition described in [14] or the molded body described in [15].

Advantageous Effects of Invention

According to the present invention, it is possible to provide a polyurethane chain extender and a composition for forming a polyurethane-based resin which can improve mechanical properties of an obtained polyurethane-based resin, and a polyurethane-based resin with improved mechanical properties, as well as a polyurethane-based resin composition, a molded body, and an article.

DESCRIPTION OF EMBODIMENTS

Hereinafter, embodiments for carrying out the present invention (hereinafter, referred to simply as "the present embodiment") will be described in detail. The following embodiments are examples for explaining the present invention, and do not limit the contents of the present invention. The present invention can be modified as appropriate within the scope of the gist. In the present embodiment, the preferred stipulations can be optionally employed, and combinations of the preferred ones are considered more preferable. In the present embodiment, the phrase "from XX to YY" means "XX or more and YY or less".

[Polyurethane Chain Extender]

A polyurethane chain extender of the present invention includes an amine compound (X) represented by the following Formula (1), where the proportion of a trans-isomer in the amine compound (X) is 50 mol % or more.

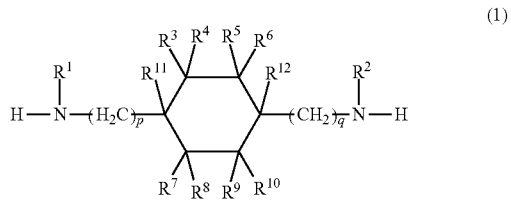

In Formula (1), $R^1$ to $R^{12}$ each independently represent a hydrogen atom or a hydrocarbon group having 1 or more and 4 or less of carbon atoms, p and q each independently represent an integer of 0 or more and 4 or less, and at least one of p or q is 1 or more.

The polyurethane chain extender of the present invention is used as a chain extender in the production of a polyurethane-based resin, which allows the mechanical properties of the resulting polyurethane-based resin to be improved. Here in the present specification, examples of the mechanical properties include tensile strength, tensile elastic modulus, and hardness.

(Amine Compound (X))

The amine compound (X) is a compound represented by the above Formula (1).

In the above Formula (1), $R^1$ to $R^{12}$ each independently represent a hydrogen atom or a hydrocarbon group having 1 or more and 4 or less of carbon atoms.

$R^1$ and $R^2$ are, each independently, preferably a hydrogen atom or an alkyl group having 1 or more and 4 or less of carbon atoms, more preferably a hydrogen atom, a methyl group or an ethyl group, even more preferably a hydrogen atom or a methyl group, even more preferably a hydrogen atom, and further even more preferably both $R^1$ and $R^2$ are hydrogen atoms, from the viewpoint of further improving the mechanical properties of the obtained polyurethane-based resin.

$R^3$ to $R^{12}$ are, each independently, preferably a hydrogen atom or an alkyl group having 1 or more and 4 or less of carbon atoms, more preferably a hydrogen atom, a methyl group, or an ethyl group, even more preferably a hydrogen atom or a methyl group, even more preferably a hydrogen atom, and further even more preferably all of $R^3$ to $R^{12}$ are hydrogen atoms, from the viewpoint of further improving the mechanical properties of the obtained polyurethane-based resin.

Each independently, p and q are an integer of 0 or more and 4 or less. From the viewpoint of further improving the mechanical properties of the resulting polyurethane-based resin, p and q are preferably 1 or more, and preferably 3 or less, more preferably 2 or less, and even more preferably 1, and both p and q are even more preferably 1. However, at least one of p or q is an integer of 1 or more and 4 or less.

From the viewpoint of further improving the mechanical properties of the obtained polyurethane-based resin, the amine compound (X) preferably includes at least one selected from 1,4-bis(aminomethyl)cyclohexane and derivatives thereof, and more preferably 1,4-bis(aminomethyl) cyclohexane.

Here, examples of the derivatives of 1,4-bis(aminomethyl)cyclohexane include a compound in which at least one of the hydrogen atoms of $R^1$ to $R^{12}$ in Formula (1) is substituted with a hydrocarbon group having 1 or more and 4 or less of carbon atoms. The hydrocarbon group in the derivatives of 1, 4-bis(aminomethyl)cyclohexane is preferably an alkyl group having 1 or more and 3 or less of carbon atoms, more preferably a methyl group or an ethyl group, and still more preferably a methyl group, from the viewpoint of further improving the mechanical properties of the resulting polyurethane-based resin.

These amine compounds (X) may be used alone, or in combination of two or more kinds. The amine compound (X) can be produced by a known method.

The proportion of the trans-isomer in the amine compound (X) is 50 mol % or more, and from the viewpoint of further improving the mechanical properties of the obtained polyurethane-based resin, it is preferably 55 mol % or more, more preferably 58 mol % or more, and even more preferably 60 mol % or more, and from the same viewpoint, it is preferably 100 mol % or less, more preferably less than 100 mol %, and even more preferably 99 mol % or less. From the viewpoint of practical productivity, the proportion of the trans-isomer in the amine compound (X) is more preferably 97 mol % or less, more preferably 95 mol % or less, more preferably 93 mol % or less, more preferably 90 mol % or less, and more preferably 88 mol % or less.

Here, the amine compound (X) includes both cis- and trans-isomers of the amine compound represented by Formula (1), and the total of the cis-isomer and the trans-isomer in the amine compound (X) is 100 mol %. The cis-isomer of the amine compound (X) means an amine compound in which the two amino group-containing groups in Formula (1) are at the cis position in the cyclohexane ring, and the trans-isomer of the amine compound (X) means an amine compound in which the two amino group-containing groups in Formula (1) are at the trans position in the cyclohexane ring.

The proportion of the trans-isomer in the amine compound (X) can be measured by a method described in Examples.

The content of the amine compound (X) in the polyurethane chain extender according to the present invention is preferably 50% by mass or more, more preferably 60% by mass or more, even more preferably 70% by mass or more, even more preferably 80% by mass or more, even more preferably 90% by mass or more, even more preferably 95% by mass or more, even more preferably 98% by mass or more, further even more preferably 99% by mass or more, from the viewpoint of further improving the mechanical properties of the resulting polyurethane-based resin, and is preferably 100% by mass or less from the same viewpoint.
(Other Components)

The polyurethane chain extender according to the present invention may appropriately contain a chain extender other than the amine compound (X) within a range that does not impair the object of the present invention. Examples of the chain extender other than the amine compound (X) include chain extenders that are generally used as a chain extender for polyurethane-based resins. Examples of such a chain extender include typically known polyhydric alcohols and amine compounds other than the amine compound (X).
[Composition for Forming Polyurethane-Based Resin]

The composition for forming a polyurethane-based resin of the present invention is a composition for forming a polyurethane-based resin, and includes a polyisocyanate compound (A), a polyol compound (B), and the above-described polyurethane chain extender according to the present invention (hereinafter, also referred as "polyurethane chain extender (C)").

Also, the composition for forming a polyurethane-based resin of the present invention may be a composition including an isocyanate group-terminated prepolymer obtained by reacting a polyisocyanate compound (A) with a polyol compound (B), and a polyurethane chain extender (C).

Since the composition for forming a polyurethane-based resin according to the present invention includes the polyurethane chain extender (C) according to the present invention described above, it is possible to improve the mechanical properties of the resulting polyurethane-based resin.
(Polyisocyanate Compound (A))

The polyisocyanate compound (A) is not particularly limited as long as it has two or more isocyanate groups, and a typically known compound can be used.

Examples of the diisocyanate compound having two isocyanate groups include chain aliphatic diisocyanate compounds such as 1,6-hexamethylene diisocyanate (HDI), 2,2,4-trimethylhexamethylene diisocyanate, methylene diisocyanate, isopropylene diisocyanate, lysine diisocyanate, lysine diisocyanate methyl ester and 1,5-octylene diisocyanate; alicyclic structure-containing diisocyanate compounds such as 4,4'-dicyclohexylmethane diisocyanate, isophorone diisocyanate (IPDI), norbornane diisocyanate, hydrogenated tolylene diisocyanate, methylcyclohexane diisocyanate, isopropylidene bis(4-cyclohexyl isocyanate) and dimer acid diisocyanate; and aromatic ring-containing diisocyanate compounds such as 2,4- or 2,6-tolylene diisocyanate (TDI), 4,4'-diphenylmethane diisocyanate (MDI), 1,5-naphthylene diisocyanate, p- or m-xylylene diisocyanate (XDI), tolidine diisocyanate, p-phenylene diisocyanate, diphenylether diisocyanate, diphenylsulfone diisocyanate, dianisidine diisocyanate and tetramethyl-m-xylylene diisocyanate.

Examples of the polyisocyanate compound having three or more isocyanate groups include triphenylmethane triisocyanate, triisocyanate phenylthiophosphate, polymethylene polyphenylene polyisocyanate (polymeric MDI), an isocyanurate modified product which is a trimer of HDI or TDI, and a biuret modified product.

The polyisocyanate compound (A) can be used alone, or two or more kinds can be used in combination.

Among these, a diisocyanate having two isocyanate groups is preferable, an alicyclic structure-containing diisocyanate compound is more preferable, and isophorone diisocyanate is still more preferable, as the polyisocyanate compound (A).
(Polyol Compound (B))

Polyol compound (B) is not particularly limited, and a known type can be used.

Examples of the polyol compound (B) include polyester-based polyols, polyether-based polyols, polycarbonate-based polyols, and polylactone-based polyols.

The polyester-based polyol is not particularly limited as long as it is a condensate of a polyvalent carboxylic acid or a reactive derivative thereof and a polyhydric alcohol, and examples thereof include those obtained by condensation polymerization of a dicarboxylic acid and a glycol.

Examples of the dicarboxylic acid include chain aliphatic dicarboxylic acids such as succinic acid, glutaric acid, adipic acid, azelaic acid, sebacic acid, dodecanedicarboxylic acid, fumaric acid, and maleic acid; aromatic dicarboxylic acids such as orthophthalic acid, terephthalic acid, isophthalic acid, and 2,6-naphthalenedicarboxylic acid; reactive derivatives thereof; and alicyclic dicarboxylic acids such as 1,3-cyclopentanedicarboxylic acid, 1,2-cyclohexanedicarboxylic acid, 1,3-cyclohexanedicarboxylic acid, and 1,4-cyclohexanedicarboxylic acid. These dicarboxylic acid can be used alone, or two or more kinds can be used in combination.

Examples of the glycols include chain aliphatic glycols such as dimethylene glycol, ethylene glycol, diethylene glycol, triethylene glycol, tetraethylene glycol, propylene glycol, dipropylene glycol, tripropylene glycol, 1,3-propanediol, neopentyl glycol, 2,2-diethyl-1,3-propanediol, butylethylpropanediol, 1,2-butanediol, butylene glycol, 1,4-butanediol, dimethylbutanediol, 1,5-pentanediol, 2,4-diethylpentanediol, 1,6-hexanediol, 3-methyl-1,5-pentanediol, 1,8-octanediol, 1,9-nonanediol, 1,10-decanediol, 1,12-dodecanediol and polyethylenebutylene glycol; alicyclic glycols such as 1,3-cyclopentanediol, 1,4-cyclohexanediol, 1,4-cyclohexanedimethanol and 2,2-bis(4-hydroxycyclohexyl)propane; and aromatic ring-containing glycols such as m-xylylene glycol, p-xylylene glycol, bisphenol A, bisphenol F and bisphenol S.

These glycols can be used alone, or two or more kinds can be used in combination.

Examples of the polyester-based polyol include condensed polyester polyols such as polyethylene adipate glycol, polybutylene adipate glycol, polyhexamethylene adipate glycol, and polyethylene butylene adipate glycol.

Examples of the based polyether polyol include polytetramethylene glycol, polyethyleneglycol, and polypropylene glycol.

Examples of the polycarbonate-based polyol include polyols obtained by a dealcoholization reaction between a low molecular weight polyol such as ethylene glycol, propylene glycol, butanediol, pentanediol, hexanediol, octanediol, nonanediol, or 1,4-cyclohexanedimethanol and a carbonate compound such as diethylene carbonate, dipropylene carbonate, or diphenyl carbonate.

Examples of the polylactone-based polyol include a lactone-based polyester diol such as a polylactone diol, a polycaprolactone diol, or a polymethylvalerolactone diol obtained by ring-opening polymerization of a lactone using the above-described low-molecular-weight polyol as an initiator.

As the polyol compound (B), a polyol used in an aqueous polyurethane-based resin may be used. The polyol used in the aqueous polyurethane-based resin is not particularly limited, and examples thereof include polyols having an anionic group, and preferably polyols containing a carboxyl group such as dimethylolpropionic acid, dimethylolbutanoic acid, dimethylolbutyric acid, and dimethylolvaleric acid.

The polyol compound (B) can be used alone, or two or more kinds can be used in combination.

Among these, as the polyol compound (B), at least one selected from the group consisting of a polyester-based polyol and a polyether-based polyol is preferable, a polyether-based polyol is more preferable, at least one selected from the group consisting of polytetramethylene glycol, polyethylene glycol, and polypropylene glycol is more preferable, and polytetramethylene glycol is further preferable.

In the composition for forming a polyurethane-based resin according to the present invention, the ratio of the number of active hydrogen groups in the polyurethane chain extender (C) to the total amount of the number of active hydrogen groups in the polyol compound (B) and the number of active hydrogen groups in the polyurethane chain extender (C) is preferably 0.01 or more, more preferably 0.02 or more, and even more preferably 0.04 or more from the viewpoint of further improving the mechanical properties of the resulting polyurethane-based resin, and is preferably 0.5 or less, more preferably 0.4 or less, even more preferably 0.3 or less, even more preferably 0.2 or less, and even more preferably 0.15 or less from the same viewpoint.

In the composition for forming a polyurethane-based resin according to the present invention, the ratio of the number of isocyanate groups in the polyisocyanate compound (A) to the sum of the number of active hydrogen groups in the polyol compound (B) and the number of active hydrogen groups in the polyurethane chain extender (C) is preferably 0.5 or more, more preferably 0.6 or more, even more preferably 0.7 or more, even more preferably 0.8 or more, and even more preferably 0.9 or more from the viewpoint of further improving the mechanical properties of the resulting polyurethane-based resin, and is preferably 1.5 or less, more preferably 1.4 or less, even more preferably 1.3 or less, even more preferably 1.2 or less, and even more preferably 1.1 or less from the same viewpoint.

The composition for forming a polyurethane-based resin according to the present invention may include one or more solvents, as needed. As the solvent, a known solvent can be used, and examples thereof include methyl ethyl ketone, ethyl acetate, toluene, xylene, acetone, and water.

When the composition for forming a polyurethane-based resin composition according to the present invention includes the solvent, a solid content concentration of the polyiurethane-based resin composition is preferably 5% by mass or more, more preferably 10% by mass or more, further preferably 15% by mass or more, and even further preferably 20% by mass or more, and preferably 80% by mass or less, more preferably 65% by mass or less, further more preferably 50% by mass or less, and further more preferably 40% by mass or less.

When the composition for forming a polyurethane-based resin according to the present invention includes water as a solvent, the composition for forming a polyurethane-based resin may be an emulsion.

The total content of the polyisocyanate compound (A), the polyol compound (B), and the polyurethane chain extender (C) or the total content of the isocyanate group-terminated prepolymer obtained by the reaction of the polyisocyanate compound (A) and the polyol compound (B) and the polyurethane chain extender (C) is preferably 50% by mass or more, more preferably 60% by mass or more, even more preferably 70% by mass or more, even more preferably 80% by mass or more, even more preferably 90% by mass or more, even more preferably 95% by mass or more, even more preferably 98% by mass or more, and even more preferably 99% by mass or more from the viewpoint of further improving the mechanical properties of the resulting polyurethane-based resin, and preferably 100% by mass or less from the same viewpoint, when the total solid content included in the composition for forming polyurethane-based resin according to the present invention is 100% by mass.

[Polyurethane-Based Resin]

The polyurethane-based resin of the present invention is formed from the composition for forming a polyurethane-based resin according to the present invention described above.

The polyurethane-based resin of the present invention may be obtained by reacting the polyisocyanate compound (A), the polyol compound (B), and the polyurethane chain extender (C) according to the present invention described above.

Since the polyurethane-based resin according to the present invention includes the above-described polyurethane chain extender (C) according to the present invention, mechanical properties may be improved.

Here, since the polyurethane-based resin according to the present invention uses the amine compound (X) as the polyurethane chain extender (C), the polyurethane-based resin has a urea bond in its structure. Therefore, the polyurethane-based resin according to the present invention includes a polyurethane-urea resin, and is preferably a polyurethane-urea resin.

The polyurethane-based resin according to the present invention can be produced by heating the composition for forming a polyurethane-based resin according to the present invention described above.

The polyurethane-based resin according to the present invention can be produced by, for example, a so-called prepolymer method in which an isocyanate group-terminated prepolymer obtained by reacting the polyisocyanate compound (A) and the polyol compound (B) in advance is reacted with the polyurethane chain extender (C), or a so-called one shot method in which the polyol compound (B) and the urethane chain extender (C) are mixed in advance and the mixture is reacted with the polyisocyanate compound (A).

From the viewpoint of further improving the mechanical properties of the polyurethane-based resin, the tensile strength of the polyurethane-based resin according to the present invention is preferably 1.0 MPa or more, more preferably 1.1 MPa or more, even more preferably 1.2 MPa or more, even more preferably 1.3 MPa or more, even more preferably 1.4 MPa or more. From the viewpoint of further improving the mechanical properties of the polyurethane-based resin, the tensile strength is preferably as high as possible. Thus, the upper limit thereof is not particularly limited, but may be, for example, 10 MPa or less, 5.0 MPa or less, or 2.0 MPa or less.

The tensile strength can be measured in accordance with JIS K 6251:2017 under the conditions of a tensile speed of 200 mm/min and a chuck-to-chuck distance of 50 mm, and specifically, can be measured by the method described in Examples described later.

From the viewpoint of further improving the mechanical properties of the polyurethane-based resin, the tensile elastic modulus of the polyurethane-based resin according to the present invention is preferably 2.5 MPa or more, more preferably 2.6 MPa or more, even more preferably 2.7 MPa or more, even more preferably 2.8 MPa or more, even more preferably 2.9 MPa or more. From the viewpoint of further improving the mechanical properties of the polyurethane-based resin, the tensile elastic modulus is preferably as high as possible. Thus, the upper limit is not particularly limited, but may be, for example, 10 MPa or less, 5.0 MPa or less, or 3.5 MPa or less.

The tensile elastic modulus can be measured in accordance with JIS K 6251:2017 under the conditions of a tensile speed of 200 mm/min and a chuck-to-chuck distance of 50 mm, and concretely, can be measured by the method described in Examples described later.

The Shore A hardness of the polyurethane-based resin according to the present invention is preferably 50 or more, more preferably 53 or more, even more preferably 55 or more, even more preferably 56 or more, even more preferably 58 or more, and even more preferably 59 or more, from the viewpoint of further improving the mechanical properties of the polyurethane-based resin. From the viewpoint of further improving the mechanical properties of the polyurethane-based resin, the Shore A hardness is preferably as high as possible. Thus, the upper limit value is not particularly limited, but may be, for example, 80 or less, 70 or less, or 65 or less.

The Shore A hardness can be measured in accordance with JIS K 6253:2012.

Specifically, the Shore A hardness can be measured by the method described in Examples below.

[Polyurethane-Based Resin Composition]

The polyurethane-based resin composition of the present invention includes the above-described polyurethane-based resin according to the present invention. Since the polyurethane-based resin composition according to the present invention includes the above-described polyurethane-based resin according to the present invention, the mechanical properties may be improved.

The content of the polyurethane-based resin according to the present invention in the polyurethane-based resin composition according to the present invention, from the viewpoint of further improving the mechanical properties of the polyurethane-based resin, is preferably 50% by mass or more, more preferably 60% by mass or more, still more preferably 70% by mass or more, even more preferably 80% by mass or more, and still more preferably 90% by mass or more, even still more preferably 95% by mass or more, further even more preferably 98% by mass or more, and further even still more preferably 99% by mass or more, and preferably 100% by mass or less, from the same viewpoint, based on 100% by mass of the total resin components included in the polyurethane-based resin composition according to the present invention.

The polyurethane-based resin composition according to the present invention may include one or more solvents, as needed. As the solvent, a known solvent can be used, and examples thereof include methyl ethyl ketone, ethyl acetate, toluene, xylene, acetone, and water.

When the polyurethane-based resin composition according to the present invention includes a solvent, the solid content concentration of the polyurethane-based resin composition is preferably 5% by mass or more, more preferably 10% by mass or more, further preferably 15% by mass or more, and even further preferably 20% by mass or more, and preferably 80% by mass or less, more preferably 70% by mass or less, further preferably 65% by mass or less, and even further preferably 60% by mass or less.

When the polyurethane-based resin composition according to the present invention includes water as a solvent, the polyurethane-based resin composition may be an emulsion.

The polyurethane-based resin composition according to the present invention is not particularly limited, and can be widely used in, for example, foams, elastomers, paints, fibers, fiber processing agents, adhesives, pressure-sensitive adhesives, binders, inks, flooring materials, sealants, caulking, medical materials, leather materials, tire materials, coating agents, active energy ray-curable resin compositions, and the like.

The polyurethane-based resin composition according to the present invention may further include known additives such as silane coupling agents, fillers, thixotropic agents, tackifiers, waxes, plasticizers, thermal stabilizers, antioxidants, ultraviolet absorbers, light resistant stabilizers, fiber-based reinforcing materials, pigments, fluorescent brighteners, foaming agents, thermoplastic resins other than the above-described polyurethane-based resins, thermosetting resins, dyes, conductivity-imparting agents, antistatic agents, moisture permeability enhancers, water repellents, oil repellents, hollow foams, crystal water-containing compounds, flame retardants, water absorbents, moisture absorbents, deodorants, antibacterial agents, antifungal agents, antiblocking agents, antihydrolytic agents, organic water-soluble compounds, inorganic water-soluble compounds, and mold release agents.

The method for producing the polyurethane-based resin composition according to the present invention is not particularly limited, and examples thereof include a method in which the polyurethane-based resin according to the present invention and the above-described additives as necessary are mixed in a kneader, a Henschel mixer, or the like, the resulting mixture is supplied to an extruder, melt-kneaded at a general temperature (for example, 150 to 250° C.) where a general thermoplastic polyurethane-based resin is extruded, and then formed into pellets by strand cutting or underwater cutting to prepare; and a method in which the polyurethane-based resin according to the present invention is dispersed, dissolved, or emulsified in a solvent to prepare.

[Molded Body and Article]

A molded body of the present invention is obtained by molding the above-described polyurethane-based resin composition of the present invention. Also, an article of the present invention includes the polyurethane-based resin composition of the present invention or the molded body of the present invention. That is, the polyurethane-based resin composition according to the present invention described above can be suitably used for producing various molded bodies and articles.

Since the molded body and the article according to the present invention include the above-described polyurethane-based resin composition according to the present invention, the mechanical properties can be improved.

The article according to the present invention may be entirely constituted by the polyurethane-based resin composition or the molded body according to the present invention, or may be partially constituted by the polyurethane-based resin composition or the molded body according to the present invention. Examples of an aspect in which a part thereof is constituted by the polyurethane-based resin composition or the molded body according to the present invention include a configuration in which a layer of the polyurethane-based resin composition or the molded body according to the present invention is provided on the surface or the inside thereof; and a configuration in which a layer impregnated with the polyurethane-based resin composition according to the present invention is provided on the surface or the inside thereof.

As a molding method of the polyurethane-based resin composition according to the present invention, a general molding method of a thermoplastic polyurethane-based resin can be applied, and examples thereof include molding methods such as extrusion molding, injection molding, inflation molding, blow molding, vacuum molding, centrifugal molding, rotational molding, calendar processing, roll processing, and press processing. By these molding methods, molded bodies having various shapes, such as resin plates, films, sheets, and deformed products, can be produced from the polyurethane-based resin composition according to the present invention.

Examples of the molded bodies and articles include mechanical industrial parts such as belt, tube, hose, wire coating material, cable coating material, fire hose, gear, caster, packing, and wind power generation windmill; vehicle parts such as tire, tire part, bumper, side molding, tail lamp seal, snow chains, ball joint seal, constant velocity joint boot, bellows, spring covering material, ABS cable, ABS cable plug, instrument panel skin, gear shift knob, console box, door seal cover, sheet material, and door knob; film and sheet, such as various sheets, various laminates, air mat, artificial leather, synthetic leather, and protective films; daily commodities such as shoe soles, watch band, camera grip, animal ear tag, smartphone case, tablet case, keyboard protective cover, and ornament; medical applications such as cardiac valve, bypass device, artificial ventricle, dialysis tube, thin film, connector, catheter, medical tube, and pacemaker insulation; construction materials such as interior and exterior materials; sports goods such as skis and racket; coated products; and printed products.

EXAMPLES

Hereinafter, the present invention will be described through Examples, but the present invention is not limited to the range of Examples.

(Measurement of Trans-Isomer Proportion in Amine Compound)

Using a GC apparatus Agilent 7890B GC (available from Agilent Technologies, Inc.), the proportion of the trans-isomer was measured. Specifically, the proportion of the trans-isomer was calculated from the ratio of FID detection intensities (area values).

In each of Examples and Comparative Examples, the following were used as a polyurethane chain extender, a polyisocyanate compound, and a polyol compound.

(Polyurethane Chain Extender)

1,3-BAC: 1,3-bis(aminomethyl)cyclohexane (trans-isomer proportion: 25 mol %, available from MITSUBISHI GAS CHEMICAL COMPANY, INC.)
 1,4-BAC: 1,4-bis(aminomethyl)cyclohexane (trans-isomer proportion: 43 mol %, available from MITSUBISHI GAS CHEMICAL COMPANY, INC.)
 1,4-BAC: 1,4-bis(aminomethyl)cyclohexane (trans-isomer proportion: 85 mol %, available from MITSUBISHI GAS CHEMICAL COMPANY, INC.)
 1,4-BAC: 1,4-bis(aminomethyl)cyclohexane (trans-isomer proportion: 100 mol %, available from Tokyo Chemical Industry Co., Ltd.)
 1,4-BAC: 1,4-bis(aminomethyl)cyclohexane (trans-isomer proportion: 99 mol %, prepared according to the following Production Example 1)
 1,4-BAC: 1,4-bis(aminomethyl)cyclohexane (trans-isomer proportion: 70 mol %, prepared according to the following Production Example 2)
 1,4-BAC: 1,4-bis(aminomethyl)cyclohexane (trans-isomer proportion: 60 mol %, prepared according to the following Production Example 3)
 IPDA: isophorone diamine (available from Tokyo Chemical Industry Co., Ltd.)

(Production Example 1:1,4-BAC (the Proportion of Trans-Isomer: 99 Mol %))

It was prepared by mixing 1,4-BAC (2 parts by mass) having a trans-isomer proportion of 43 mol % and 1,4-BAC (98 parts by mass) having a trans-isomer proportion of 100 mol %.

(Production Example 2:1,4-BAC (the Proportion of Trans-Isomer: 70 Mol %))

It was prepared by mixing 1,4-BAC (35 parts by mass) having a trans-isomer proportion of 43 mol % and 1,4-BAC (65 parts by mass) having a trans-isomer proportion of 85 mol %.

(Production Example 3:1,4-BAC (the Proportion of Trans-Isomer: 60 Mol %))

It was prepared by mixing 1,4-BAC (58 parts by mass) having a trans-isomer proportion of 43 mol % and 1,4-BAC (42 parts by mass) having a trans-isomer proportion of 85 mol %.

(Polyisocyanate Compound)

IPDI: isophorone diisocyanate (available from Tokyo Chemical Industry Co., Ltd.)

(Polyol Compound)
PTMG: polytetramethylene glycol (available from FUJI-FILM Wako Pure Chemical Corporation)
(Other Compound)
MEK: methyl ethyl ketone (available from Kanto Chemical Co., Inc.)

Example 1

(1) Synthesis of Isocyanate Group-Terminated Prepolymer 1

101 g of PTMG (OH group equivalents: 500 g/eq.) was added to a 500 mL four-neck separable flask equipped with a stirring blade and a thermo couple, and a dewatering treatment was performed for 1 hour under the conditions of 100° C. and a pressure reduction degree 100 to 200 hPa. Thereafter, the mixture was air-cooled to 70° C., a cooling tube was provided, 79 g of MEK and 0.045 g of dibutyltin dilaurate were added, and the mixture was heated to 70° C. in a nitrogen atmosphere. After the temperature reached 70° C., a dropping funnel was attached and 25 g of IPDI was added dropwise over 60 minutes, followed by stirring at 70° C. for 3 hours. Thereafter, 210 g of MEK was added to adjust the solid part concentration to 30% by mass, and obtained solution was moved out as a solution of an isocyanate group-terminated prepolymer (prepolymer 1).

(2) Synthesis of Polyurethane Urea Resin by Chain Extension Reaction

In nitrogen atmosphere, 150 g of the solution of the prepolymer 1 was added to a 500 mL four-neck separable flask equipped with a stirring blade, a nitrogen-introducing tube, a thermocouple, a cooling tube and a dropping funnel, and heated to 60° C. After the temperature reached 60° C., 0.51 g of 1,4-BAC (trans-isomer proportion: 85 mol %) as a polyurethane chain extender was added dropwise over one minute, followed by stirring at 60° C. for 30 minutes. Each of the resulting solutions was poured into a stainless steel mold coated with a mold release agent, aged for 1 week under the conditions of 23° C./50% RH, and then aged for 1 hour in an oven at an internal temperature of 60° C. to obtain a 1.5 mm-thick polyurethaneurea resin test plate.

For the resulting polyurethaneurea resin test plate, the following respective evaluations were performed. The results obtained are presented in Tables.

(Tensile Strength and Tensile Elastic Modulus)

The test plate was subjected to a tensile test, and the tensile strength (MPa) and tensile elastic modulus (MPa) were measured, respectively. Specifically, in accordance with the method described in JIS K 6251:2017, a 10 mm-wide sample was cut out from the test plate, and measurement was performed using a tensile tester (available from Toyo Seiki Seisaku-sho, Ltd., Strograph EII-L05) under the conditions of a tensile speed of 200 mm/min and a chuck-to-chuck distance of 50 mm. Still, the tensile elastic modulus was calculated from the formula below:

$$E = (\sigma2 - \sigma1)/(\varepsilon2 - \varepsilon1).$$

E: tensile elastic modulus (MPa)
σ1: tensile stress measured at a strain ε1=0.05
σ2: tensile stress measured at a strain ε2=0.1

(Hardness (Shore A))

The hardness (Shore A) of the test plates was measured. Specifically, in accordance with the method described in JIS K 6253:2012, a hardness meter (available from TECLOCK Co., Ltd., durometer type A GS-719N) was pressed against a test plate, and the value was read.

Examples 4 to 6 and Comparative Examples 1 and 2

Test plates of polyurethane urea resins were obtained respectively in the same manner as in Example 1 except that the polyurethane chain extender 1,4-BAC (trans-isomer proportion: 85 mol %) was changed to the polyurethane chain extender presented in the Tables.

With respect to the obtained test plates of the polyurethane urea resin, the respective evaluations described above were performed. The results obtained are presented in Tables.

Comparative Example 3

Test plates of polyurethane urea resins were obtained in the same manner as in Example 1 except that 0.51 g of 1,4-BAC (trans-isomer proportion: 85 mol %) as a polyurethane chain extender was changed to 0.61 g of IPDA presented in Tables.

With respect to the obtained test plates of the polyurethane urea resin, the respective evaluations described above were performed. The results obtained are presented in Tables.

Example 2

(1) Synthesis of Isocyanate Group-Terminated Prepolymer 2

90 g of PTMG (OH group equivalents: 500 g/eq.) was added to a 500 mL four-neck separable flask equipped with a stirring blade and a thermo couple, and a dewatering treatment was performed for 1 hour under the conditions of 100° C. and a pressure reduction degree 100 to 200 hPa. Thereafter, the mixture was air-cooled to 70° C., a cooling tube was provided, 77 g of MEK and 0.045 g of dibutyltin dilaurate were added, and the mixture was heated to 70° C. in a nitrogen atmosphere. After the temperature reached 70° C., a dropping funnel was attached and 25 g of IPDI was added dropwise over 30 minutes, followed by stirring at 70° C. for 3 hours. Thereafter, 199 g of MEK was added to adjust the solid part concentration to 30% by mass, and obtained solution was moved out as a solution of an isocyanate group-terminated prepolymer (prepolymer 2).

(2) Synthesis of Polyurethane Urea Resin by Chain Extension Reaction 156 g of the solution of the prepolymer 2 was added to a 500 mL four-neck separable flask equipped with a stirring blade, a nitrogen-introducing tube, a thermo couple, a cooling tube, and a dropping funnel, and heated to 60° C. After the temperature reached 60° C., 1.28 g of a polyurethane chain extender 1,4-BAC (trans-isomer proportion: 85 mol %), was added dropwise over one minute, followed by stirring at 60° C. for 30 minutes. Each of the obtained solutions was poured into a stainless steel mold coated with a mold release agent, aged for 1 week under conditions of 23° C./50% RH, and then aged for 1 hour in an oven at an internal temperature of 60° C. to obtain a 1.5 mm-thick polyurethaneurea test plate.

With respect to the obtained test plates of the polyurethane urea resin, the respective evaluations described above were performed. The results obtained are presented in Tables.

Comparative Example 4

112.5 g of PTMG (OH group equivalents: 500 g/eq.) was added to a 500 mL four-neck separable flask equipped with a stirring blade and a thermo-couple, and a dehydrating treatment was performed for 1 hour under the conditions of 100° C./a pressure reduction degree of 100 to 200 hPa. Thereafter, the mixture was air-cooled to 70° C., a cooling tube was provided, 77 g of MEK and 0.045 g of dibutyltin dilaurate were added, and the mixture was heated to 70° C. in a nitrogen atmosphere. After the temperature reached 70° C., a dropping funnel was attached and 25 g of IPDI was added dropwise over 30 minutes, followed by stirring at 70° C. for 3 hours. Thereafter, MEK 200 g was added to adjust the solid part concentration to 30% by mass and obtained solution was moved out as a solution of the polyurethane resin. Each of the obtained solutions was poured into a stainless steel mold coated with a mold release agent, aged for 1 week under the conditions of 23° C./50% RH, and then aged for 1 hour in an oven at an internal temperature of 60° C. to obtain a polyurethane resin-made test plate with 1.5 mm-thick.

Comparative Examples 5 and 6

Test plates of polyurethane urea resins were obtained in the same manner as in Example 2 except that the polyurethane chain extender 1,4-BAC (trans-isomer proportion: 85 mol %) was changed to the polyurethane chain extender presented in Tables.

With respect to the obtained test plates of the polyurethane urea resin, the respective evaluations described above were performed. The results obtained are presented in Tables.

Comparative Example 7

Test plates of polyurethane urea resins were obtained respectively in the same manner as in Example 2 except that 1.28 g of the polyurethane chain extender 1,4-BAC (trans-isomer proportion: 85 mol %) was changed to 1.53 g of IPDA presented in Tables.

With respect to the obtained test plates of the polyurethane urea resin, the respective evaluations described above were performed. The results obtained are presented in Tables.

Example 3

(1) Synthesis of Isocyanate Group-Terminated Prepolymer 3

107 g of PTMG (OH group equivalents: 500 g/eq.) was added to a 500 mL four-neck separable flask equipped with a stirring blade and a thermo couple, and a dewatering treatment was performed for 1 hour under the conditions of 100° C. and a pressure reduction degree 100 to 200 hPa. Thereafter, the mixture was air-cooled to 70° C., a cooling tube was provided, 88 g of MEK and 0.045 g of dibutyltin dilaurate were added, and the mixture was heated to 70° C. in a nitrogen atmosphere. After the temperature reached 70° C., a dropping funnel was attached and 25 g of IPDI was added dropwise over 30 minutes, followed by stirring at 70° C. for 3 hours. Thereafter, 222 g of MEK was added to adjust the solid part concentration to 30% by mass, and obtained solution was moved out as a solution of an isocyanate group-terminated prepolymer (prepolymer 3).

(2) Synthesis of Polyurethane Urea Resin by Chain Extension Reaction 80 g of the prepolymer 3 was added to a 500 mL four-neck separable flask equipped with a stirring blade, a nitrogen-introducing tube, a thermo couple, a cooling tube and a dropping funnel, and heated to 60° C. After the temperature reached 60° C., 0.14 g of 1,4-BAC (trans-isomer proportion: 85 mol %) as a polyurethane chain extender was added dropwise over one minute, followed by stirring at 60° C. for 30 minutes. Each of the obtained solutions was poured into a stainless steel mold coated with a mold release agent, aged for 1 week under conditions of 23° C./50% RH, and then aged for 1 hour in an oven at an internal temperature of 60° C. to obtain a 1.5 mm-thick polyurethaneurea test plate.

With respect to the obtained test plates of the polyurethane urea resin, the respective evaluations described above were performed. The results obtained are presented in Tables.

Comparative Examples 8 and 9

Test plates of polyurethane urea resins were obtained respectively in the same manner as in Example 3 except that the polyurethane chain extender 1,4-BAC (trans-isomer proportion: 85 mol %) was changed to the polyurethane chain extender presented in Tables.

With respect to the obtained test plates of the polyurethane urea resin, the respective evaluations described above were performed. The results obtained are presented in Tables.

Comparative Example 10

Test plates of polyurethane urea resins were obtained respectively in the same manner as in Example 3 except that 0.14 g of 1,4-BAC (trans-isomer proportion: 85 mol %) as a polyurethane chain extender was changed to 0.17 g of IPDA presented in Tables.

With respect to the obtained test plates of the polyurethane urea resin, the respective evaluations described above were performed. The results obtained are presented in Tables.

TABLE 1

|  |  | Example 1 | Comparative Example 1 | Comparative Example 2 | Comparative Example 3 | Comparative Example 4 |
|---|---|---|---|---|---|---|
| Polyisocyanate (eq.) | IPDI | 1 | 1 | 1 | 1 | 1 |
| Polyol (eq.) | PTMG | 0.9 | 0.9 | 0.9 | 0.9 | 1 |
| Chain extender (eq.) | 1,4-BAC (trans-isomer 85 mol %) | 0.1 |  |  |  |  |
|  | 1,3-BAC |  | 0.1 |  |  |  |

TABLE 1-continued

|  |  | Example 1 | Comparative Example 1 | Comparative Example 2 | Comparative Example 3 | Comparative Example 4 |
|---|---|---|---|---|---|---|
|  | 1,4-BAC (trans-isomer 43 mol %) |  |  | 0.1 |  |  |
|  | IPDA |  |  |  | 0.1 |  |
| Tensile strength | MPa | 1.49 | 1.21 | 1.25 | 0.83 | 0.17 |
| Tensile modulus of elasticity | MPa | 3.09 | 2.67 | 2.83 | 2.12 | 0.75 |
| Hardness (Shore A) | Type A | 60 | 60 | 58 | 55 | 42 |

TABLE 2

|  |  | Example 2 | Comparative Example 5 | Comparative Example 6 | Comparative Example 7 | Comparative Example 4 |
|---|---|---|---|---|---|---|
| Polyisocyanate (eq.) | IPDI | 1 | 1 | 1 | 1 | 1 |
| Polyol (eq.) | PTMG | 0.8 | 0.8 | 0.8 | 0.8 | 1 |
| Chain extender (eq.) | 1,4-BAC (trans-isomer 85 mol %) | 0.2 |  |  |  |  |
|  | 1,3-BAC |  | 0.2 |  |  |  |
|  | 1,4-BAC (trans-isomer 43 mol %) |  |  | 0.2 |  |  |
|  | IPDA |  |  |  | 0.2 |  |
| Tensile strength | MPa | 1.28 | 0.54 | 0.66 | 0.96 | 0.17 |
| Tensile modulus of elasticity | MPa | 2.81 | 1.83 | 2.03 | 2.45 | 0.75 |
| Hardness (Shore A) | Type A | 56 | 46 | 49 | 50 | 42 |

TABLE 3

|  |  | Example 3 | Comparative Example 8 | Comparative Example 9 | Comparative Example 10 | Comparative Example 4 |
|---|---|---|---|---|---|---|
| Polyisocyanate (eq.) | IPDI | 1 | 1 | 1 | 1 | 1 |
| Polyol (eq.) | PTMG | 0.95 | 0.95 | 0.95 | 0.95 | 1 |
| Chain extender (eq.) | 1,4-BAC (trans-isomer 85 mol %) | 0.05 |  |  |  |  |
|  | 1,3-BAC |  | 0.05 |  |  |  |
|  | 1,4-BAC (trans-isomer 43 mol %) |  |  | 0.05 |  |  |
|  | IPDA |  |  |  | 0.05 |  |
| Tensile strength | MPa | 2.90 | 2.70 | 2.83 | 2.84 | 0.17 |
| Tensile modulus of elasticity | MPa | 2.63 | 1.15 | 2.15 | 2.30 | 0.75 |
| Hardness (Shore A) | Type A | 61 | 60 | 60 | 59 | 42 |

TABLE 4

|  |  | Example 1 | Example 4 | Example 5 | Example 6 | Comparative Example 2 |
|---|---|---|---|---|---|---|
| Polyisocyanate (eq.) | IPDI | 1 | 1 | 1 | 1 | 1 |
| Polyol (eq.) | PTMG | 0.9 | 0.9 | 0.9 | 0.9 | 0.9 |
| Chain extender (eq.) | 1,4-BAC | 0.1 | 0.1 | 0.1 | 0.1 | 0.1 |

TABLE 4-continued

|  |  | Example 1 | Example 4 | Example 5 | Example 6 | Comparative Example 2 |
|---|---|---|---|---|---|---|
| Chain extender trans-isomer proportion (mol %) |  | 85 | 99 | 70 | 60 | 43 |
| Tensile strength | MPa | 1.49 | 1.72 | 1.45 | 1.86 | 1.25 |
| Tensile modulus of elasticity | MPa | 3.09 | 2.93 | 2.90 | 3.05 | 2.83 |
| Hardness (Shore A) | Type A | 60 | 62 | 61 | 62 | 58 |

In Tables 1 to 4, when Examples and Comparative Examples in which the proportions of the polyisocyanate compound, the polyol compound, and the polyurethane chain extender are the same are compared with each other, it can be seen that the polyurethane urea resins of Examples are further improved in their mechanical properties.

The invention claimed is:

1. A composition for forming a polyurethane-based resin, comprising a polyisocyanate compound (A), a polyol compound (B), and a polyurethane chain extender (C) comprising an amine compound (X) represented by the following Formula (1),
wherein a proportion of a trans-isomer in the amine compound (X) is 50 mol % or more:

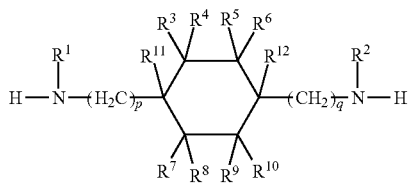

where in the above Formula (1), $R^1$ to $R^{12}$ each independently represent a hydrogen atom or a hydrocarbon group having 1 or more and 4 or less of carbon atoms, p and q each independently represent an integer of 0 or more and 4 or less, and at least one of p or q is 1 or more.

2. The composition of claim 1, wherein the amine compound (X) comprises a 1,4-bis (aminomethyl) cyclohexane.

3. The composition according to claim 1, wherein the proportion of a trans-isomer in the amine compound (X) is 100 mol % or less.

4. A polyurethane-based resin formed from the composition for forming the polyurethane-based resin described in claim 1.

5. The polyurethane-based resin according to claim 4, wherein a ratio of the number of active hydrogen groups in the polyurethane chain extender (C) to a total amount of the number of active hydrogen groups in the polyol compound (B) and the number of active hydrogen groups in the polyurethane chain extender (C) is 0.01 or more and 0.5 or less.

6. The polyurethane-based resin according to claim 4, wherein a ratio of the number of isocyanate groups in the polyisocyanate compound (A) to a total amount of the number of active hydrogen groups in the polyol compound (B) and the number of active hydrogen groups in the polyurethane chain extender (C) is 0.5 or more and 1.5 or less.

7. The polyurethane-based resin according to claim 4, wherein a tensile strength of the polyurethane-based resin measured in accordance with JIS K 6251:2017 under conditions of a tensile speed of 200 mm/min and a chuck-to-chuck distance of 50 mm is 1.0 MPa or more.

8. The polyurethane-based resin according to claim 4, wherein a tensile elastic modulus of the polyurethane-based resin measured in accordance with JIS K 6251:2017 under conditions of a tensile speed of 200 mm/min and a chuck-to-chuck distance of 50 mm is 2.5 MPa or more.

9. The polyurethane-based resin according to claim 4, wherein a Shore A hardness of the polyurethane-based resin measured in accordance with JIS K 6253:2012 is 50 or more.

10. The polyurethane-based resin according to claim 4, which is a polyurethane-urea resin.

11. A polyurethane-based resin composition, comprising the polyurethane-based resin described in claim 4.

12. A molded body formed by molding the polyurethane-based resin composition described in claim 11.

13. An article, comprising the polyurethane-based resin composition described in claim 11.

14. An article, comprising the molded body described in claim 12.

15. A composition for forming a polyurethane-based resin, comprising: an isocyanate group-terminated prepolymer obtained by reacting a polyisocyanate compound (A) with a polyol compound (B); and a polyurethane chain extender (C) comprising an amine compound (X) represented by the following Formula (1),
wherein a proportion of a trans-isomer in the amine compound (X) is 50 mol % or more:

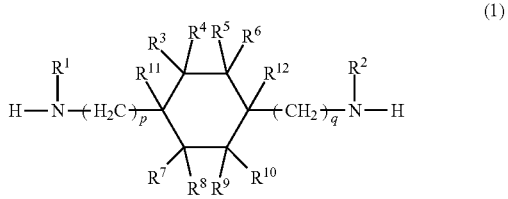

where in the above Formula (1), $R^1$ to $R^{12}$ each independently represent a hydrogen atom or a hydrocarbon group having 1 or more and 4 or less of carbon atoms, p and q each independently represent an integer of 0 or more and 4 or less, and at least one of p or q is 1 or more.

16. A polyurethane-based resin formed from the composition for forming the polyurethane-based resin described in claim 15.

17. A polyurethane-based resin composition, comprising the polyurethane-based resin described in claim 16.

18. An article, comprising the polyurethane-based resin composition described in claim 17.

19. An article comprising the polyurethane-based resin composition described in claim 17.

20. The article of claim 18 which is in the form of a molded body.

\* \* \* \* \*